(12) United States Patent
Newbright

(10) Patent No.: US 11,485,259 B2
(45) Date of Patent: Nov. 1, 2022

(54) CHILD SEAT FOR ATTACHING TO A MOTOR VEHICLE SEAT

(71) Applicant: CYBEX GmbH, Bayreuth (DE)

(72) Inventor: Kent Newbright, Houston, OH (US)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 15/733,631

(22) PCT Filed: Mar. 19, 2019

(86) PCT No.: PCT/EP2019/056752
§ 371 (c)(1),
(2) Date: Sep. 21, 2020

(87) PCT Pub. No.: WO2019/179968
PCT Pub. Date: Sep. 26, 2019

(65) Prior Publication Data
US 2021/0016691 A1    Jan. 21, 2021

(30) Foreign Application Priority Data

Mar. 21, 2018   (DE) ................... 20 2018 101 575.3

(51) Int. Cl.
*B60N 2/28* (2006.01)
(52) U.S. Cl.
CPC ......... *B60N 2/2884* (2013.01); *B60N 2/2806* (2013.01); *B60N 2/2851* (2013.01); *B60N 2/2878* (2013.01); *B60N 2002/2818* (2013.01)

(58) Field of Classification Search
CPC .......... B60N 2/2851; B60N 2002/2818; B60N 2/2884
See application file for complete search history.

(56) References Cited

U.S. PATENT DOCUMENTS

| | | | | |
|---|---|---|---|---|
| 3,784,253 A | * | 1/1974 | Kohler | B60N 2/85 297/410 |
| 6,655,702 B2 | * | 12/2003 | Senger | B60N 2/01541 280/30 |
| 7,631,935 B2 | * | 12/2009 | Chen | B60N 2/2851 297/284.9 |

(Continued)

FOREIGN PATENT DOCUMENTS

| | | |
|---|---|---|
| DE | 202004020396.0 U1 | 7/2005 |
| DE | 202016104181 | 8/2016 |

(Continued)

OTHER PUBLICATIONS

"International Application No. PCT/EP2019/056752, International Search Report and Written Opinion dated Jun. 11, 2019", (Jun. 11, 2019), 11 pgs.

(Continued)

*Primary Examiner* — David R Dunn
*Assistant Examiner* — Tania Abraham
(74) *Attorney, Agent, or Firm* — Schwegman Lundberg & Woessner, P.A.

(57) ABSTRACT

The invention relates to a child seat for attaching to a motor vehicle seat, comprising a seat region, a backrest, a headrest having at least one belt guide, and a headrest inclination adjustment device for adjusting an inclination of the headrest relative to the backrest.

14 Claims, 5 Drawing Sheets

(56) References Cited

U.S. PATENT DOCUMENTS

Figure 1:
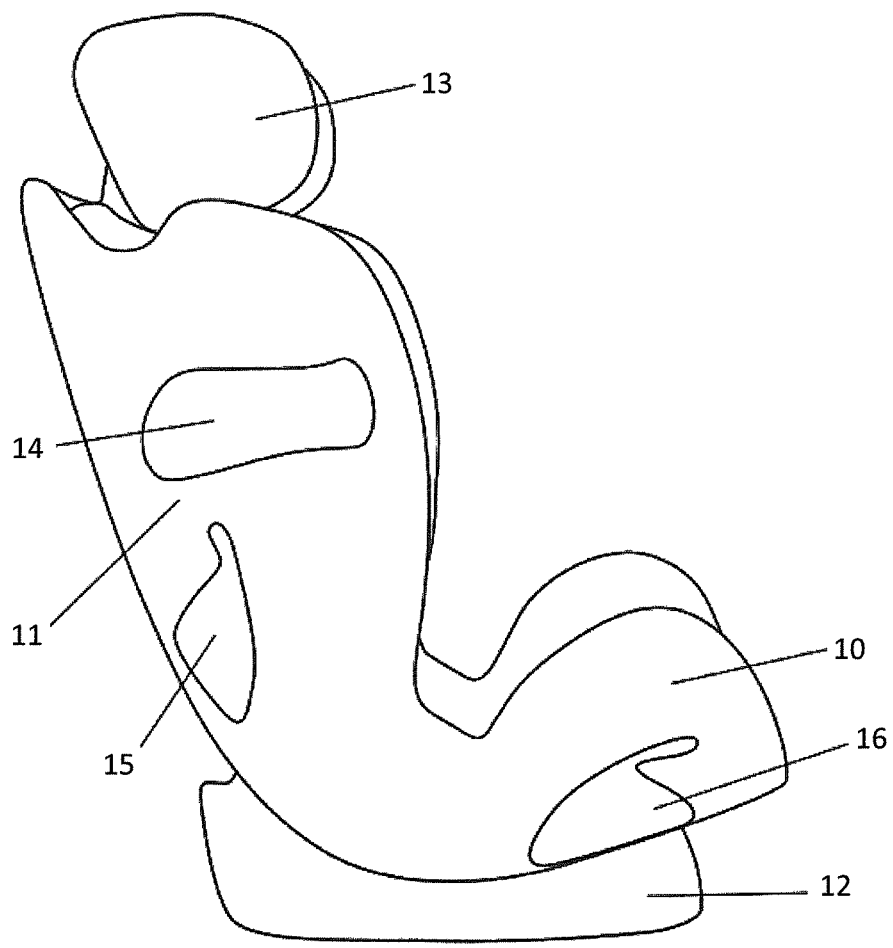

| | | | |
|---|---|---|---|
| 8,931,836 B2* | 1/2015 | Cheng | B60N 2/888 297/216.11 |
| 2006/0033374 A1* | 2/2006 | Pos | B60N 2/847 297/397 |
| 2006/0267387 A1 | 11/2006 | Koenig et al. | |
| 2008/0018158 A1 | 1/2008 | Pos | |

FOREIGN PATENT DOCUMENTS

| | | | |
|---|---|---|---|
| WO | WO-2005002906 A1 | 1/2005 | |
| WO | WO-2007104989 A2 * | 9/2007 | B60N 2/2851 |
| WO | WO-2019179968 A1 | 9/2019 | |

OTHER PUBLICATIONS

"International Application No. PCT/EP2019/056752, International Preliminary Report on Patentability and Written Opinion dated Oct. 1, 2020", (English Translation), 9 pgs.

\* cited by examiner

CHILD SEAT FOR ATTACHING TO A MOTOR VEHICLE SEAT

PRIORITY CLAIM TO RELATED APPLICATIONS

This application is a U.S. national stage filing under 35 U.S.C. § 371 from International Application No. PCT/EP2019/056752, filed on 19 Mar. 2019, and published as WO2019/179968 on 26 Sep. 2019, which claims the benefit under 35 U.S.C. 119 to German Application No. 20 2018 101 575.3, filed on 21 Mar. 2018, the benefit of priority of each of which is claimed herein, and which applications and publication are hereby incorporated herein by reference in their entirety.

The invention relates to a child seat which is mountable on a motor vehicle seat.

In the prior art, child seats mountable on a motor vehicle seat are generally known. It is also known that such child seats may have a headrest and may be designed for attachment to the car's belt system. Usually child seats comprise at least one seat shell or seat area and a backrest. The child seat according to the invention may in principle also comprise these features.

Furthermore, it is noted that in the context of this invention the term "child seat" is to be understood as a generic term for "classical" child seats and infant carriers. Preferably, however, the child seat of this invention is a (classical) child seat (for larger children, e.g., group I/II and/or III child seat), which has a backrest structurally separated from a seat area, the inclination of which can be varied with respect to the seat area, if necessary. The structural delineation may be formed by a kink or similar. In general, however, (unless otherwise stated in the specific context) child seat is always to be understood as an abbreviated form of writing for "child seat, in particular infant carrier" or, within the scope of this invention, features intended for a child seat are in principle also applicable to an infant carrier and vice versa (unless otherwise stated). The same applies to the term "child", which is also to be understood as a generic term for children and babies and infants. So-called "infant carriers" often comprise (only) a one-piece shell to hold the baby or child and may include a separate belt system, a headrest if necessary, and other components if necessary. Instead of a (structurally separate) backrest, such "infant carriers" have a back section which is connected to a "seat area" in which the child's buttocks can be accommodated.

It is generally known that a child in a child seat is secured by the car's three-point belt or by a belt provided on the child seat itself (for example a five-point belt, a chest belt or similar). A belt may be passed over one shoulder of the child in the seat towards an opposite side of the pelvis. However, two belts may also be provided, each of which is routed over one of the shoulders.

In addition, the state of the art generally includes height-adjustable headrests. The height adjustment of the headrest serves in particular to adapt the child seat to the respective size of the (growing) child. However, the adaptability of the known headrests is considered to be in need of improvement.

It is therefore an objective of the invention to propose a child seat with a headrest, which is characterized by a comparatively high level of comfort.

The objective is solved by a child seat mountable on a motor vehicle seat, the child seat comprising a seat area, a backrest, a headrest and (at least) one headrest inclination adjusting device for adjusting an inclination of the headrest relative to the backrest. This allows the inclination of the headrest to be adjusted accordingly (in particular a flatter position or a rest position or a less flat position or upright position in which the child can be active). In particular, the headrest should preferably comprise an (integrated) belt guide, wherein then the possible adjustment relative to the backrest of the inclination of the headrest includes at least one (in this case co-rotating) belt guide.

A first core idea of the invention is to propose a headrest that is adjustable in terms of its inclination relative to the backrest. A second particularly preferred aspect is that such an inclination-adjustable headrest comprises at least one belt guide. The belt guide can then be swiveled with the headrest as part of the headrest when the inclination of the headrest is changed. It was recognized that by changing the inclination of the headrest, the forces acting on the child's body (for example in the event of an impact) are also different, which is taken into account by the fact that the belt guide also swivels with the change in the inclination of the headrest. This means that changes in the forces that occur can be compensated for at least partially. Overall, a comfortable headrest is therefore proposed that meets comparatively high safety requirements.

A belt guide is a receptacle, for example in the form of a recess and/or an opening (a slit), which allows a section of a safety belt to be accommodated or guided. Furthermore, the belt guide can be configured in such a way that threading is possible, but (unintentional) loosening of the belt guide is at least made more difficult. A corresponding blocking device (for example in the form of a projection, especially on the inside of a U-leg of a U-shaped cross-section of the belt guide) may be provided. In principle, a cross-section of the belt guide can be U-shaped. The U-shaped cross-section can be designed to have a lower and an upper leg. The blocking device (if provided) is then preferably provided on the lower leg. The U-shape can be comparatively elongated so that the U-legs are at least twice as large as a distance between the U-legs. As an alternative or in addition to the above-described co-rotating belt guide, at least one belt guide may also be provided which does not co-rotate when the headrest is adjusted for inclination (and is provided e.g. on the backrest, in particular on a headrest mounting element—or directly connected to it, if necessary—which may be provided for adjusting the height of the headrest), i.e. remains rotationally fixed. If necessary, the headrest may not have a belt guide that rotates (swivels) with the headrest. This prevents forces from being transferred via the belt guide to a swiveling part of the headrest in an impact situation, which may be advantageous from a safety point of view.

Basically, a change of inclination is a turn movement (rotation) around an at least essentially horizontal axis.

Preferably, the headrest comprises side cheeks which co-rotate with the inclination adjustment. In particular, the side cheeks are thus an integral part of the headrest (without excluding the possibility that the side cheeks may, for example, be folded further outwards or further inwards or may be swiveled about an at least essentially vertical axis relative to the other components of the headrest). Said co-rotation of the side cheeks improves comfort on the one hand and ensures a comparatively high level of safety on the other, since the protective function of the side cheeks remains at least essentially unchanged regardless of the inclination of the headrest.

In an embodiment, the headrest (opposite the backrest) is height-adjustable and/or is mounted height-adjustable. In particular, the headrest can be connected to a headrest base part, which in turn can be (e.g. glidingly) moved within or relative to the backrest. Appropriate locking devices may be provided to lock one or more (e.g. at least two or at least three or at least five) different height positions accordingly.

The headrest and in particular its belt guide can be configured such that the headrest (in a state in which a steeper inclination is possible or in a state in which the headrest is in an inclined position which can be further raised) is transferred to the steeper, in particular the steepest, inclined position when a (predetermined) inertia force applied by a belt (safety belt), in particular a vehicle belt, is exceeded. This ensures that the headrest is transferred to a (maximum) upright position, particularly in the event of a sharp deceleration and a resulting tractive force acting on the headrest through the belt, so that the child's head is caught comparatively early by the headrest, which is then rotated forwards to the maximum, when it bounces backwards again (towards the backrest) after or in the course of the braking process(s). This reduces the path of movement of the child's head when it bounces back, which reduces the risk of injury. In particular, this increases the safety of the child seat. A transferability should here and in the following mean in particular that a transfer can take place in such a way that no (irreversible) damage occurs. Alternatively, it is also possible that intentional weak points (e.g. predetermined breaking points and/or predetermined buckling points) are provided, which enable a (possibly at least partially irreversible or with a structure destruction connected) transfer when a certain force threshold is exceeded.

Alternatively or additionally, the headrest can be configured and/or mounted such that (in a state in which a steeper inclination is possible) it is transferred (in a state in which a steeper inclination is possible) to the steeper, in particular a steepest, inclination position when a predetermined inertial force, which is preferably at least 2 g (g denotes acceleration of gravity), more preferably at least 4 g and/or preferably at most 12 g, more preferably at most 9 g, is exceeded. The headrest can thus be configured such that an inertia force, which results in particular from a deceleration process (for example in the event of a collision) or which results from the fact that the headrest continues to move (or "wants to move") on the one hand and the child seat as a whole, in particular the backrest, is decelerated on the other hand, at least proportionally causes a steeper or the steepest inclined position to be engaged. This inertia force which then occurs should therefore be sufficient (when a certain force threshold is exceeded) to transfer the headrest to a steeper (steepest) inclination position (possibly in combination with a force of a belt acting on the belt guide). This is another effective way of ensuring that the child's head can only move backwards to a comparatively small extent (in the event of a braking maneuver, for example in a collision), which increases the safety of the child seat.

A displacement (caused by the inertia force described above and/or the tensile force of a belt described above) can be realized, for example, in that a lock in a certain inclined position only holds until a certain force is exceeded and gives way (or is released) when the force is exceeded. Alternatively or additionally, an (other) restoring and/or holding force of a holding device can be set in such a way that the inclined position is (firmly) held only until the force threshold just mentioned is exceeded.

It is preferable that an inclination of the backrest is adjustable relative to the seat area and/or a seat base (if provided). Further preferably the backrest being coupled to the headrest in such a way that a change in the inclination of the backrest (relative to the seat area and/or the base) (automatically) leads to a change in the inclination of the headrest (relative to the backrest) and/or vice versa. This makes it possible to adjust in a comparatively simple manner a rest position (with flatter orientation of the backrest and flatter orientation of the headrest relative to the backrest) in which the child can rest and at least one further position in which the backrest is set up comparatively steeply and the headrest is also set up comparatively steeply relative to the backrest, in which the child is then, for example, in an awake state. Overall, this simplifies the operation of the child seat.

The inclination of the headrest (relative to the backrest) can be set in at least (or exactly) two or at least (or exactly) three or at least (or exactly) four or at least (or exactly) five or even more different inclination positions.

A possible angular range (i.e. the difference between an angle at the steepest position and an angle at the flattest position of the headrest) of an inclination adjustment may be at least 3°, preferably at least 8°, more preferably at least 12°, more preferably at least 15° and/or at most 30°, preferably at most 22°.

The angle (of the headrest or its head-backrest) in the maximum flattened inclination position maybe (relative to the vertical—in the position of use of the seat—; if the inclination of the backrest is adjustable per se, in the case of a maximum upright backrest) at least 12°, preferably at least 24° and/or at most 45°, preferably at most 35°. The angle in the maximum upright position is preferably (with respect to the vertical) at least 0°, more preferably at least 6° still more preferably at least 10° and/or at most 20°, preferably at most 15°. In general, the headrest is inclined (at least) backwards in the maximum flattened inclined position with respect to the vertical—in the position of use of the seat. This may also apply to the maximum upright position, so that in general (irrespective of the specific position) the headrest is always (more or less) inclined backwards in relation to the vertical. If the headrest can be adjusted (locked) in several (in particular three or more) inclination settings, an angular distance between the individual positions may be at least 4°, preferably at least 7°, and/or at most 16°, preferably at most 12°.

At least one first and/or at least one second and/or at least one third connecting device may be provided to connect the headrest to the backrest.

Furthermore, at least one first and/or at least one second and/or at least one third locking device may be provided to lock a tilting position of the headrest.

The first and/or second connecting device(s) is/are preferably configured to be movable (in particular with at least one or exactly one degree of freedom). By a movable design of the invention it is to be understood in particular that the parts connected to each other in each case can be moved (in particular pivoted) relative to each other, whereby this movement is however in particular restricted (by at least one blocking device, at least one stop and/or the like). The third connecting device is preferably designed as (fixed or stationary) swivel bearing.

First locking device and/or first connecting device are preferably arranged in the vicinity of the third connecting device (the swivel bearing). Arranged "in the vicinity" means in particular being located in a distance between the respective devices that is less than 12 cm, preferably less than 8 cm. Insofar as a distance is to be determined, a distance between the corresponding surface sections which produce the connection or locking device shall be of particular importance. The smallest distance between the respective surfaces under consideration should be considered as the distance.

If the first locking device and/or the first connecting device is/are arranged in the vicinity of the swivel bearing, a corresponding (additional) connection or locking can be carried out in a structurally simple manner. In particular, it can be exploited that a freedom of movement to be provided (in case of a swivel movement) can remain comparatively small if the corresponding device is arranged comparatively close.

The second connecting device is preferably located remote from the third connecting device (the swivel bearing). Alternatively or additionally, the second locking device is also arranged remote from the third connecting device (the swivel bearing). A remote arrangement means in particular an arrangement in which the distance between the respective devices is greater than 6 cm, preferably greater than 10 cm. In such a (remote) arrangement, a position of the inclination can be made particularly precise.

The first locking device and/or the first connecting device may be located at a maximum of hall the height of the headrest and/or the side cheeks. Alternatively or additionally the second locking device and/or the second connecting device may be arranged at least half the height of the headrest and/or the side cheeks. Alternatively or additionally, the second locking device and/or the second connecting device can be arranged at least three quarters of the height of the headrest and/or the side cheeks.

A relative swivel position of the swivel bearing in relation to the backrest preferably remains the same when the inclination is changed. The swivel bearing is therefore (per se) not swivel-movable relative to the backrest (however, it may be movable in translation, e.g. by means of a corresponding movable bearing element).

First and/or second locking device and/or first and/or second connecting devices may preferably be arranged above the third connecting device (of the swivel bearing).

The first connecting device preferably has at least one link guide.

The first locking device preferably has at least one locking recess and/or at least one locking projection.

The second connecting device and/or the second locking device preferably has/have at least one stretchable and foldable part, in particular a joint part, preferably a toggle lever part. The stretchable and foldable part is configured in particular in such a way that it is stretched to a maximum in a maximum upright position of the headrest and folded to a maximum in a maximum flattened position of the headrest. The stretchable and foldable part preferably comprises at least two (rigid) rods which are connected to each other via a joint and whose respective distal ends are connected to the headrest on the one hand and the backrest on the other hand. A transition from an extended configuration to a less extended (folded) configuration can then be made in particular in such a way that a tensile or compressive force is applied in the area of a joint (e.g. via a corresponding actuating device) so that the joint (or its components) is folded. This allows a change of the inclination position in a particularly simple way. Preferably, the maximum stretched position is locked, for example by a toggle lever configuration. This makes it particularly easy to provide a connecting and locking device.

The first locking device is preferably arranged at (or at least in the vicinity of) the first movable connecting device and/or is at least partially integrated into the first movable connecting device. Arranged "in the vicinity" means in particular an arrangement in which the first locking device is located less than 3 cm, preferably less than 1 cm, from the first (movable) connecting device. An (at least partial) integration of the locking device into the connecting device means that the first locking device and the first connecting device are at least partially formed by the same elements. The same elements (components) can be double-functional in this respect.

The second connecting device and the second locking device are preferably formed by a common connecting and locking device, in particular by the above-mentioned stretchable and foldable part, in particular the articulated part, preferably the toggle lever part. A corresponding toggle-joint locking device can preferably be overcome by a manual actuating force.

In the embodiments, the headrest may comprise a rear headrest part and a front headrest part. The front headrest part and the rear headrest part are preferably formed by different (structurally delimited) elements. A structural delimitation is understood in particular to be a geometric delimitation, preferably by a step or other discontinuous envelope and/or a non-monolithic connection or a material and/or form and/or force connection of the two parts.

The first and/or second and/or third connecting device and/or the first and/or locking device may be located on the rear headrest part. The front headrest part may partially or completely surround the side cheeks and, where appropriate, a rear head-backrest (against which a rear part of the child's head may rest). Alternatively or in addition, the rear headrest part may partially or completely form a rear head-backrest.

A height of the front headrest section can be at least 1.2 times, preferably at least 1.5 times, the height of the rear headrest part. The rear headrest part may have an extension in a direction away from the backrest (in the steepest inclination position) of at least 3 cm, preferably at least 5 cm and/or at most 10 cm.

The at least one belt guide is preferably arranged partly or completely below the (respective) side cheeks. In particular, one belt guide can be arranged below (at least partially below) each side cheek.

The locking of at least one inclination adjustment can be released by a displacement the headrest against a restoring force, in particular due to a restoring spring. This is a simple way to ensure that a locked state is engaged (unless it is released by an external force).

A locking of at least one inclination adjustment can preferably be released by a displacement of the headrest or a part of the headrest (for example a drawbar), preferably at least component-wise upwards. One or more locking recesses possibly provided on the backrest or connected thereto are preferably opened upwards. Alternatively or additionally, one or more locking openings provided on the headrest are preferably opened downwards.

Displacement can preferably be effected by a force, in particular a tensile force, exerted via a handle, preferably directed upwards, and/or (for example in the case of abrupt braking) by an inertia force and/or a traction force of a belt guided in the belt guide.

The above-mentioned task is further solved by a system comprising a child seat of the above type and a safety belt.

The above mentioned task is further solved by a motor vehicle with a child seat of the above type or the above system.

Furthermore, the above task is solved by a method for adjusting the inclination of a headrest of a child seat of the above type, wherein the inclination of the headrest is changed relative to a backrest, preferably using an in particular manually operated actuating device and/or an inertia force of the headrest and/or a tensile force of a belt in the belt guide. Further procedural features result from the above description of the child seat or system.

Further embodiments of the invention result from the dependent claims.

In general, the position of the headrest in relation to the seating area and/or the backrest may be variable (adjustable), in particular by movement along the backrest and/or in a direction towards or away from the seating area. The headrest may be connected to the backrest by means of a swivel bearing that allows the headrest to rotate about an (at least substantially) horizontal axis. Furthermore, locking devices may be provided on the backrest and/or the headrest to fix (lock) the headrest in at least two (or three or more) rotational positions. The respective locking device may be integrated into the swivel bearing or may be located (directly) on the swivel bearing or may be provided at a distance from the swivel bearing. The (respective) locking device may have at least one locking element (e.g. projection, in particular pin, or rod) configured to engage with one or more receptacles (recesses). For example, the latching element may be in the form of a rod or bar configured to be engaged with a corresponding device, e.g., toothing (comprising in particular several teeth).

The headrest may be connected to the backrest (in addition to the swivel bearing) by at least one other connecting device. This at least one further connecting device can have at least one degree of freedom of movement (preferably exactly one degree of freedom of movement) for the rotation of the headrest. In an embodiment, the at least one further connecting device can comprise a guide device (for example a projection, in particular a pin, which can run in a groove) or a rail mechanism or an articulated connection (or the like). Preferably at least one locking device is integrated into the further connecting device or (directly) attached to the at least one further connecting device.

Figure 2:
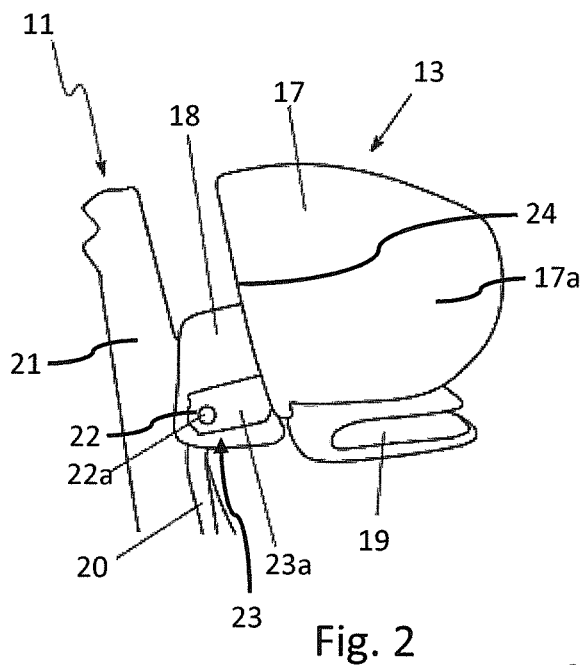
Figure 3:
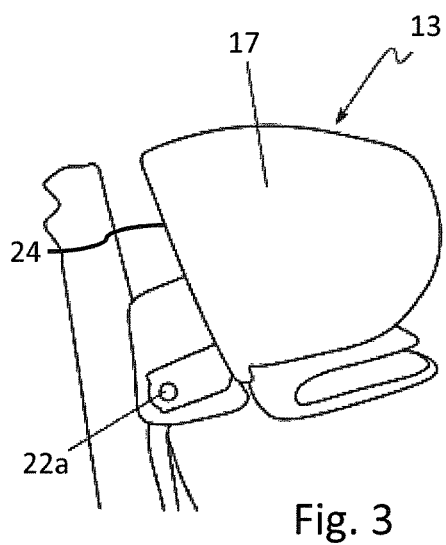
Figure 4:
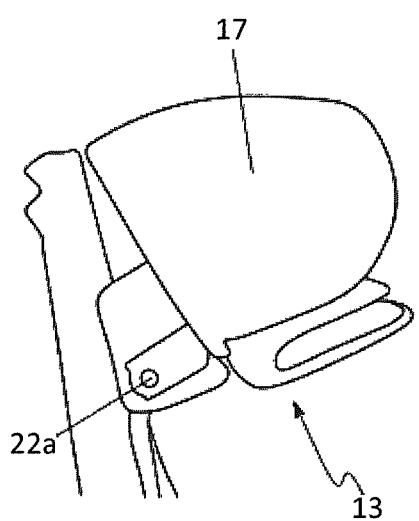
Figure 5:
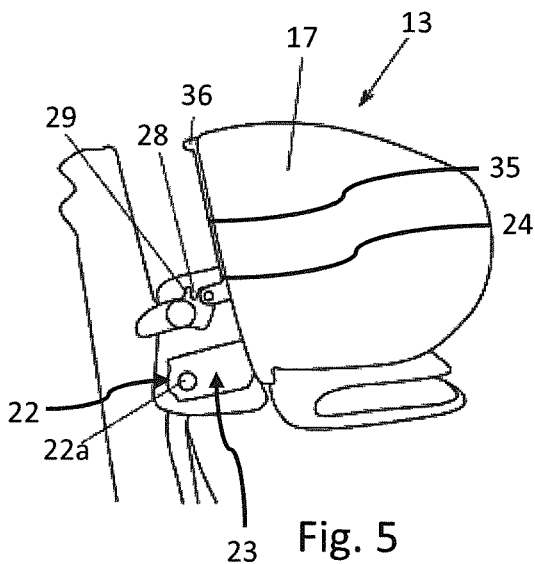
Figure 6:
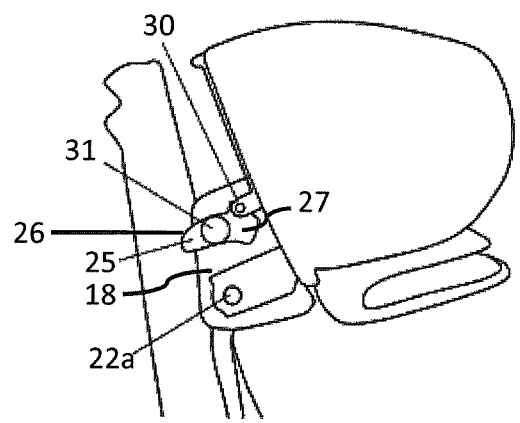
Figure 7:
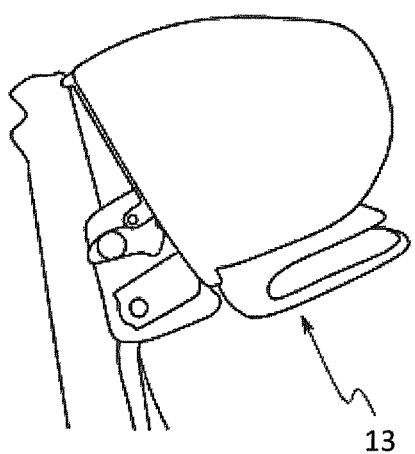
Figure 8:
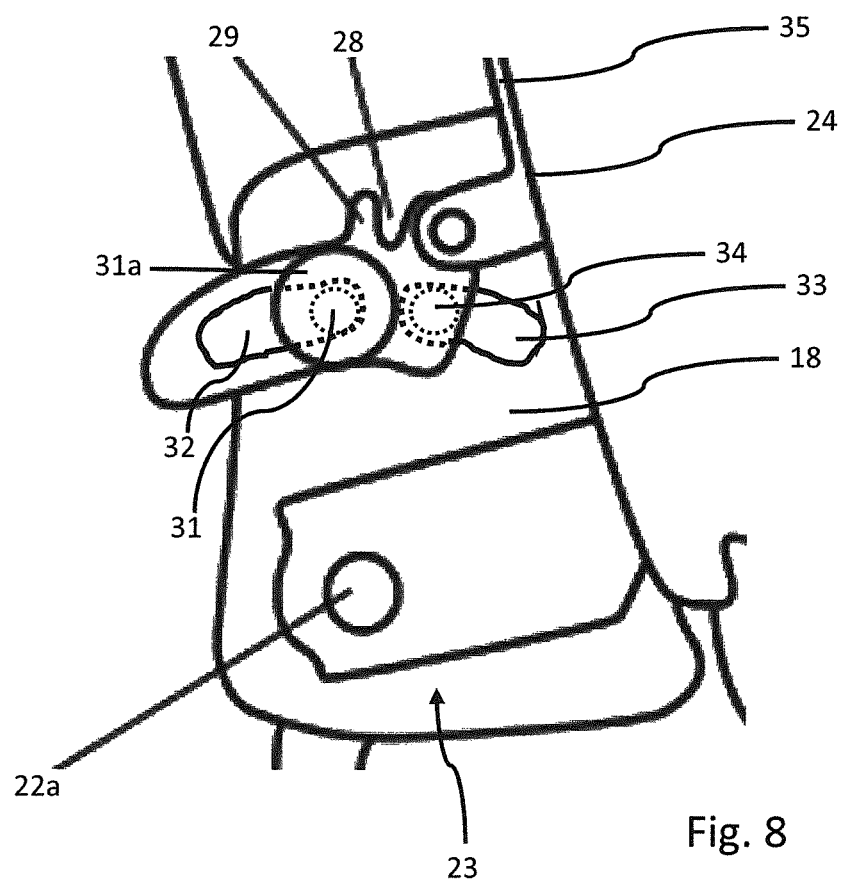
Figure 9:
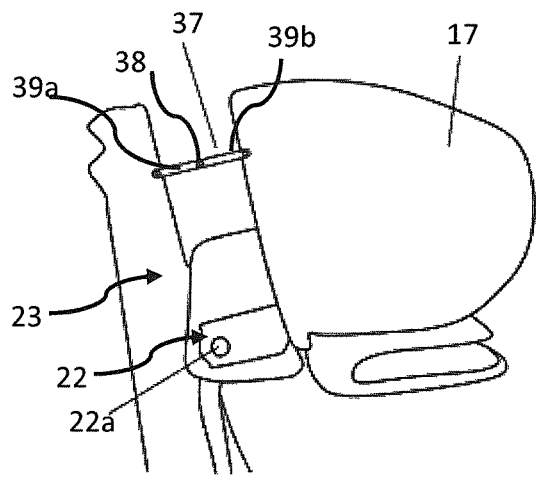
Figure 10:
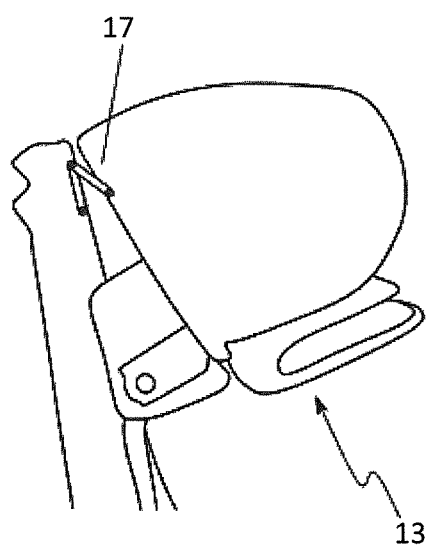

In the following, the invention is described by means of embodiments, which are explained in more detail in the figures. The figures show the following:

FIG. 1 a side view of the child seat;

FIG. 2 a detail of the child seat according to FIG. 1;

FIG. 3 the detail according to FIG. 2 in a different position of the headrest;

FIG. 4 the detail according to FIGS. 2 and 3 in a different position of the headrest;

FIG. 5 a detail analogous to FIG. 2 of another version of the child seat according to the invention;

FIG. 6 the detail according to FIG. 5 in a different position of the headrest;

FIG. 7 the detail according to FIGS. 5 and 6 in a deviating position of the headrest;

FIG. 8 a detail of the headrest from FIG. 5 with further details;

FIG. 9 a detail analogous to FIG. 2 according to another version of the child seat; and FIG. 10 the detail according to FIG. 9 in a different position of the headrest.

In the following description, the same reference signs are used for identical and identically appearing parts.

FIG. 1 shows a side view of a child seat according to the invention. The child seat comprises a seat section 10, a backrest 11, an (optional) base 12 and a headrest 13. The headrest 13 is connected to the backrest 11. The backrest 11 has (optional) at least one (e.g. foldable) side impact protection element 14 and at least one backrest belt guide 15. The seat area 10 has at least one seat area belt guide 16.

FIG. 2 shows the headrest 13 and a section of the backrest 11 adjacent to the headrest 13 according to a first design of the child seat. The headrest 13 comprises a front headrest part 17, a rear headrest part 18, and a headrest belt guide 19 (which may be configured as a separate part or as part of the front part 17). The front headrest part 17 has side cheeks 17*a* (only one of which is shown in FIG. 2). Below the side cheeks 17*a* there are correspondingly (two) headrest belt guides 19 (whereby in the figures the front belt guide in relation to the drawing plane has been omitted).

A movable support element 20 is arranged in the backrest 11, which is mounted (height-) displaceable in relation to a main body 21 of the backrest. The support element 20 can be designed flexible (elastic). In concrete terms, the support element 20 can be moved up or down (inside or on the backrest) relative to the main body 21. This also allows the headrest 13 to be moved relative to the main body 21 of the backrest 11.

Furthermore, the headrest 13 is pivotably mounted to the support element 20 via a swivel bearing 22 (=third connecting device). Specifically, at least one swivel element 23*a* of a headrest inclination adjusting device 23 can be swiveled (rotated) about a swivel axis 22*a* of the swivel bearing 22 so that the entire headrest can be swiveled.

This is further illustrated in FIGS. 3 and 4. In FIG. 2, a head-backrest 24 of the headrest 13 is (approximately) parallel to the backrest 11. In FIG. 3, the head-backrest 24 (and thus the entire headrest 13) is tilted backwards (relative to the backrest 11). In FIG. 4, the head-backrest 24 or headrest 13 is tilted even further back. The configuration according to FIG. 2 can be selected, for example, when the child is awake. The configuration according to FIG. 4 can be selected especially when the child is resting. FIG. 3 is an intermediate position which represents a compromise between adaptation to a resting or active child as shown in FIGS. 2 and 4.

On and/or in the swivel bearing 22, a (not shown) locking device, such as a bolt (in particular a projection or pin), may be provided, which may, for example, cooperate with one or more groove(s) and/or recess(es) in the backrest to allow locking in different (at least two, preferably at least or exactly three) inclined positions.

FIG. 5-8 describe an embodiment which basically corresponds to the embodiment according to FIG. 2-4, but in particular without the above described locking device (not shown in FIG. 2-4) (which may however be provided) and with a further connecting device (in addition to the swivel bearing 22), namely a first connecting device 25.

The first connecting device 25 is connected to the backrest 11 at one end 26 (fixed position). At an end 27 opposite the end 26, the first connecting device 25 (see also FIG. 8) has locking positions (at least partially formed as locking recesses) 28 defined by locking teeth 29. The first connecting device 25 forms a corresponding first locking device (or part thereof). The locking positions 28 allow the reception of a locking rod.

The rear headrest part 18 has a sliding pin 31 that can slide in a (see FIG. 8) recess (link) 32 of the first connecting device 25. The sliding pin 31 preferably has a head 31*a* located outside the recess 32 to secure it (and thus also to further secure the connection between backrest and headrest). The recess 32 (link) can be a groove or slot. Furthermore, a recess (link) 33 (e.g. groove or slot) can also (alternatively or additionally) be provided in the rear headrest part 18, within which, for example, a pin or rod 34 (indicated by a dashed line in FIG. 8) can slide, thus creating a movable and yet secure connection.

In the area of the head-backrest 24 (see FIGS. 5 and 8), an actuating device 35 is provided which (preferably by pulling it upwards) causes the locking rod 30 to be lifted from the corresponding locking position 28 so that the inclination of the headrest 13 can be adjusted. The actuating device 35 preferably has an actuating handle 36 (in the form of a projection) for this purpose. By pulling (lifting) the actuating device 35, a locking can be released by the locking rod 30 so that the first connecting device 25 can be moved relative to the headrest 13. Furthermore, a recess (not shown in the figures) can be provided in the rear headrest part 18 in which the locking rod 30 can be moved and which can be aligned with (one) locking position 28 (in each case).

Preferably, the actuating device 35 can be shifted from a locked state to a released state against the force of a return device (in particular return spring) so that the locked state is assumed without actuation of the actuating device (automatically).

The condition shown in FIG. 5 can be locked by (exactly) one of the locking teeth 29 (which blocks movement of the locking rod 30 relative to the backrest) and a front end of recess 32 (see FIG. 8; which prevents movement of the sliding pin 31 away from the backrest). Similarly, the condition shown in FIG. 7 can be locked by exactly one (namely the rearmost) locking tooth locking rod 30 between two locking teeth 29.

FIGS. 9 and 10 show a further embodiment of the child seat (in details). The headrest 13 may have all parts and features of the embodiment as shown in FIGS. 2-4 and/or 5-8 (if applicable, without the locking devices described in connection with FIGS. 2-4 but not shown in detail and/or without the first connecting device as shown in FIGS. 5-8). Furthermore, the headrest 13 according to FIGS. 9 and 10 may have a second connecting device 37 which connects the headrest 13 and the backrest 11 as an articulated connection and has at least one joint 38 (between two joint elements 39a, 39b). The second connecting device 37 can be configured in such a way that it can lock the state according to FIG. 9 and/or the state according to FIG. 10 and/or one or more intermediate states. For this purpose, the second connecting device 37 may have a toggle lever mechanism, for example.

At this point it should be noted that all of the above described parts are considered to be essential to the invention when viewed on their own and in any combination, especially the details shown in the drawings. Modifications of this are familiar to the skilled person.

REFERENCE SIGNS

10 seat area
11 backrest
12 base
13 headrest
14 side impact protection element
15 backrest belt guide
16 seat belt guide
17 front headrest part
17a side cheeks
18 rear headrest part
19 (headrest) belt guide
20 support element
21 main body
22 swivel bearing
23 headrest inclination adjusting device
23a swivel element
24 head-backrest
25 first connecting device
26 end
27 end
28 locking position
29 locking tooth
30 locking rod
31 sliding pin
32 recess
33 recess
34 pin or rod
35 actuating device
36 actuation handle
37 second connecting device
38 joint
39a joint element
39b joint element

The invention claimed is:

1. A child seat mountable on a motor vehicle seat, comprising:
    a seat area,
    a backrest,
    a headrest with at least one belt guide, and
    a headrest inclination adjusting device for adjusting an inclination of the headrest relative to the backrest, wherein the inclination ranges between a maximum upright position and a maximum inclined position, wherein at least in the maximum inclined position the headrest is inclined in a backward direction, and wherein the headrest comprises side cheeks which co-rotate with the headrest when the inclination is adjusted.

2. The child seat according to claim 1, wherein the headrest is height-adjustable or is mounted height-adjustable.

3. The child seat according to claim 1, wherein an inclination of the headrest increases when a predetermined inertia force is exceeded.

4. The child seat according to claim 1, wherein an inclination of the backrest is adjustable relative to the seat area or to a base, the backrest coupled to the headrest such that a change in the inclination of the backrest causes a change in the inclination of the headrest or vice versa.

5. The child seat according to claim 1, wherein an angle range of an inclination adjustment of the headrest is between 3° and 20°.

6. The child seat according to claim 1, wherein the at least one belt guide is configured at least partially below side cheeks.

7. A system comprising a child seat according to claim 1 and a safety belt.

8. A motor vehicle with a child seat according to claim 1 and a system
    wherein
    a locking of at least one inclination adjustment can be released by a displacement of the headrest or a part of the headrest against a restoring force from a restoring spring, or
    a locking of at least one inclination setting can be released by a displacement of the headrest or a part of the headrest, wherein one or more locking recesses on the backrest or connected thereto are opened upwards or one or more locking openings are provided on the headrest or connected thereto are opened downwards,
    wherein the displacement can be effected by a tensile force or an inertia force or a tensile force of a belt in the belt guide, exerted via a handle directed upwards.

9. A method for adjusting the inclination of a headrest of a child seat according to claim 1, wherein the inclination of the headrest is changed relative to a backrest, wherein a manually operable actuating device or an inertia force of the headrest or a tensile force of a belt in a belt guide is used for this purpose.

10. A child seat mountable on a motor vehicle seat, comprising:
   a seat area,
   a backrest,
   a headrest with at least one belt guide, and
   a headrest inclination adjusting device for adjusting an inclination of the headrest relative to the backrest, wherein the headrest and the at least one belt guide is configured such that an inclination of the headrest increases when a predetermined tensile force applied by a belt is exceeded.

11. A child seat mountable on a motor vehicle seat, comprising:
   a seat area,
   a backrest,
   a headrest with at least one belt guide, and
   a headrest inclination adjusting device for adjusting an inclination of the headrest relative to the backrest, and
   wherein the headrest comprises side cheeks which co-rotate with the headrest when the inclination is adjusted, and
   further comprising at least one first connecting device, movable with at least one degree of freedom, and a third connecting device including a swivel bearing for connecting the headrest and the backrest, and at least one first locking device for connecting the headrest and the backrest,
   wherein the first locking device or the first connecting device is coupled to the third connecting device, and
   wherein the first locking device and the first connecting device are at a maximum of half the height of the headrest and the side cheeks
   wherein a relative position of the third connecting device with respect to the backrest remains unchanged when the inclination is changed, and
   wherein the first locking device and the first connecting device are above the third connecting device, and
   wherein the first connecting device comprises at least one link guide, and
   wherein the first locking device has at least one locking recess or at least one locking projection, and
   wherein the first locking device is at or in the vicinity of the first connecting device and is at least partially integrated into the first connecting device.

12. The child seat according to claim 11, wherein the headrest comprises a rear headrest part and a front headrest part,
   wherein the front headrest part and the rear headrest part are formed by respectively different, structurally delimited elements or
   the first or the third connecting device or the first locking device is configured on the rear headrest part or
   wherein the front headrest part forms the side cheeks.

13. A child seat mountable on a motor vehicle seat, comprising:
   a seat area,
   a backrest,
   a headrest with at least one belt guide, and
   a headrest inclination adjusting device for adjusting an inclination of the headrest relative to the backrest, and
   wherein the headrest comprises side cheeks which co-rotate with the headrest when the inclination is adjusted, and
   further comprising at least one second connecting device, movable with at least one degree of freedom, and a third connecting device including a swivel bearing for connecting the headrest and the backrest, and at least one second locking device for connecting the headrest and the backrest, and
   wherein the second locking device or the second connecting device are at least half the height of the headrest and the side cheeks, and
   wherein a relative position of the third connecting device with respect to the backrest remains unchanged when the inclination is changed, and
   wherein the second locking device and the second connecting device are above the third connecting device, and
   wherein the second connecting device or the second locking device has at least one stretchable and foldable part including a toggle lever part, or
   wherein the second connecting device and the second locking device includes a common connecting and locking device.

14. The child seat according to claim 13, wherein the headrest comprises a rear headrest part and a front headrest part,
   wherein the front headrest part and the rear headrest part are formed by respectively different, structurally delimited elements or
   the second or the third connecting device or the second locking device is configured on the rear headrest part or
   wherein the front headrest part forms the side cheeks.

* * * * *